US012433193B2

(12) United States Patent
Aldridge et al.

(10) Patent No.: US 12,433,193 B2
(45) Date of Patent: Oct. 7, 2025

(54) TRANSMISSION CONTROL SYSTEM FOR LAWNMOWER, A LAWNMOWER, AND METHOD FOR TRANSMISSION CONTROL OF A LAWNMOWER

(71) Applicant: Honda Motor Co., Ltd., Tokyo (JP)

(72) Inventors: Teegan L. Aldridge, Graham, NC (US); Scott J. Kaskawitz, Hillsborough, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 880 days.

(21) Appl. No.: 17/690,241

(22) Filed: Mar. 9, 2022

(65) Prior Publication Data

US 2023/0284558 A1  Sep. 14, 2023

(51) Int. Cl.
| A01D 34/68 | (2006.01) |
| A01D 34/78 | (2006.01) |
| A01D 34/82 | (2006.01) |
| A01D 69/00 | (2006.01) |
| A01D 69/02 | (2006.01) |
| A01D 101/00 | (2006.01) |

(52) U.S. Cl.
CPC ......... A01D 34/6806 (2013.01); A01D 34/78 (2013.01); A01D 34/824 (2013.01); A01D 69/02 (2013.01); A01D 2034/6843 (2013.01); A01D 2101/00 (2013.01)

(58) Field of Classification Search
CPC .. A01D 34/6806; A01D 34/78; A01D 34/824; A01D 69/02
See application file for complete search history.

(56) References Cited

U.S. PATENT DOCUMENTS

| 2,924,055 | A  | 2/1960  | Clemson |
| 3,003,604 | A  | 10/1961 | Brueder |
| 4,610,335 | A  | 9/1986  | Miyazawa et al. |
| 5,138,824 | A  | 8/1992  | Oshima et al. |
| 5,467,583 | A  | 11/1995 | Beugelsdyk et al. |
| 6,769,501 | B2 | 8/2004  | Iida et al. |
| 7,337,598 | B2 | 3/2008  | Plouraboue et al. |
| 7,744,503 | B2 | 6/2010  | Kobayashi et al. |
| 9,334,810 | B2 | 5/2016  | Yamazaki |
| 10,729,066 | B2 | 8/2020  | Yan et al. |
| 2007/0256401 | A1 | 11/2007 | Hibi et al. |
| 2013/0046448 | A1 | 2/2013  | Fan et al. |

(Continued)

FOREIGN PATENT DOCUMENTS

| FR | 943735 A | 3/1949 |
| JP | 3111180 B2 | 11/2000 |

(Continued)

Primary Examiner — Joseph M Rocca
Assistant Examiner — Robert E Pezzuto
(74) Attorney, Agent, or Firm — KENEALY VAIDYA LLP

(57) ABSTRACT

A transmission control system and method for a lawnmower having a battery and an electric drive transmission that can include a propulsion motor and a propulsion motor driver. The control system can include a clutch lever, a speed lever, a cable connected to the clutch lever and the speed lever, a hall sensor in electrical communication with the propulsion motor driver, and a clutch arm connected to the cable and configured to actuate the hall sensor to change a speed of the electric transmission.

20 Claims, 8 Drawing Sheets

(56) References Cited

U.S. PATENT DOCUMENTS

2020/0107497 A1    4/2020  Ferrell et al.
2024/0306540 A1*   9/2024  Xu .................... A01D 34/78

FOREIGN PATENT DOCUMENTS

| JP | 3919795 B2 | 5/2007 |
| JP | 5352313 B2 | 11/2013 |
| JP | 6129086 B2 | 5/2017 |
| WO | WO2020088195 A1 | 5/2020 |

* cited by examiner

TRANSMISSION CONTROL SYSTEM FOR LAWNMOWER, A LAWNMOWER, AND METHOD FOR TRANSMISSION CONTROL OF A LAWNMOWER

BACKGROUND

The disclosed subject matter relates to a control system for managing a speed of a transmission for a lawnmower. More particularly, the disclosed subject matter relates to an apparatus that incorporates a transmission control system for an electric mower having an electric drive transmission.

Electric lawnmowers can include an implement driving assembly that drives at least one implement and a propulsion drive assembly that propels the machine along a travel surface. The implement driving assembly and the propulsion drive assembly can be coupled to a power source such as but not limited to an internal combustion engine or an electric motor. Electrical components of the mower, such as the power source, can draw electrical current from an internal power supply of the mower. The mower can be configured as a walk-behind machine or possibly can be a ride on machine such as a tractor, zero turn radius ZTR machine, ride behind machine, or other machine.

The propulsion drive assembly can include one or more inputs that control the propulsion of the electric mower. For example, the propulsion drive assembly can include an on/off clutch lever to engage or disengage the transmission.

SUMMARY

Some embodiments are directed to a transmission control system for a lawnmower having a battery and an electric drive transmission including a propulsion motor and a propulsion motor driver. The control system can include a clutch lever, a speed lever, a cable connected to the clutch lever and the speed lever, a hall sensor in electrical communication with the propulsion motor driver, and a clutch arm connected to the cable that can be configured to actuate the hall sensor to change a speed of the electric transmission.

Some embodiments are directed to a transmission control system for a lawnmower having a battery and an electric drive transmission including a propulsion motor. The control system can include a propulsion motor driver in electrical communication with the propulsion motor and the battery, a clutch lever, a cable connected to the clutch lever, a hall sensor in electrical communication with the propulsion motor driver, and a clutch arm connected to the cable and that can be configured to actuate the hall sensor to vary a speed signal transmitted to the propulsion motor driver.

Some embodiments are directed to a lawnmower that can include a deck, a handle extending from the deck, an electric motor mounted adjacent the deck, a battery electrically connected to the electric motor, a blade rotatably supported in the deck, a plurality of wheels connected to the deck, a drive shaft connected to at least one of the plurality of wheels, a propulsion motor, a gear transmission connecting the propulsion motor to the drive shaft, a propulsion motor driver in electrical communication with the battery and the propulsion motor, a clutch lever pivotably attached to the handle, a speed lever mounted to the handle, a cable connected to the clutch lever and the speed lever, a hall sensor in electrical communication with the propulsion motor driver, and a clutch arm connected to the cable and that can be configured to actuate the hall sensor to change a speed of the electric transmission.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

An electric lawnmower can include a propulsion drive assembly. The propulsion drive assembly can include one or more inputs that control the speed of the lawnmower.

In order to operate the mower, a clutch lever can engage a transmission and a separate change lever can control the speed of the transmission. However, because the clutch lever may control the engagement or disengagement of the transmission and may not control the speed, the operator may need to reach down to the change lever to vary the speed.

Thus, there is a need for a transmission control system for a mower that can facilitate variable speed control of the transmission using speed control levers that are accessible and manipulated incrementally to continuously output and/or change the speed of the mower. In other words, it may be convenient to be able to vary the speed of a mower from the clutch lever at certain times. There is also a need to replace potentiometers with other types of sensors for durability.

Figure 1:
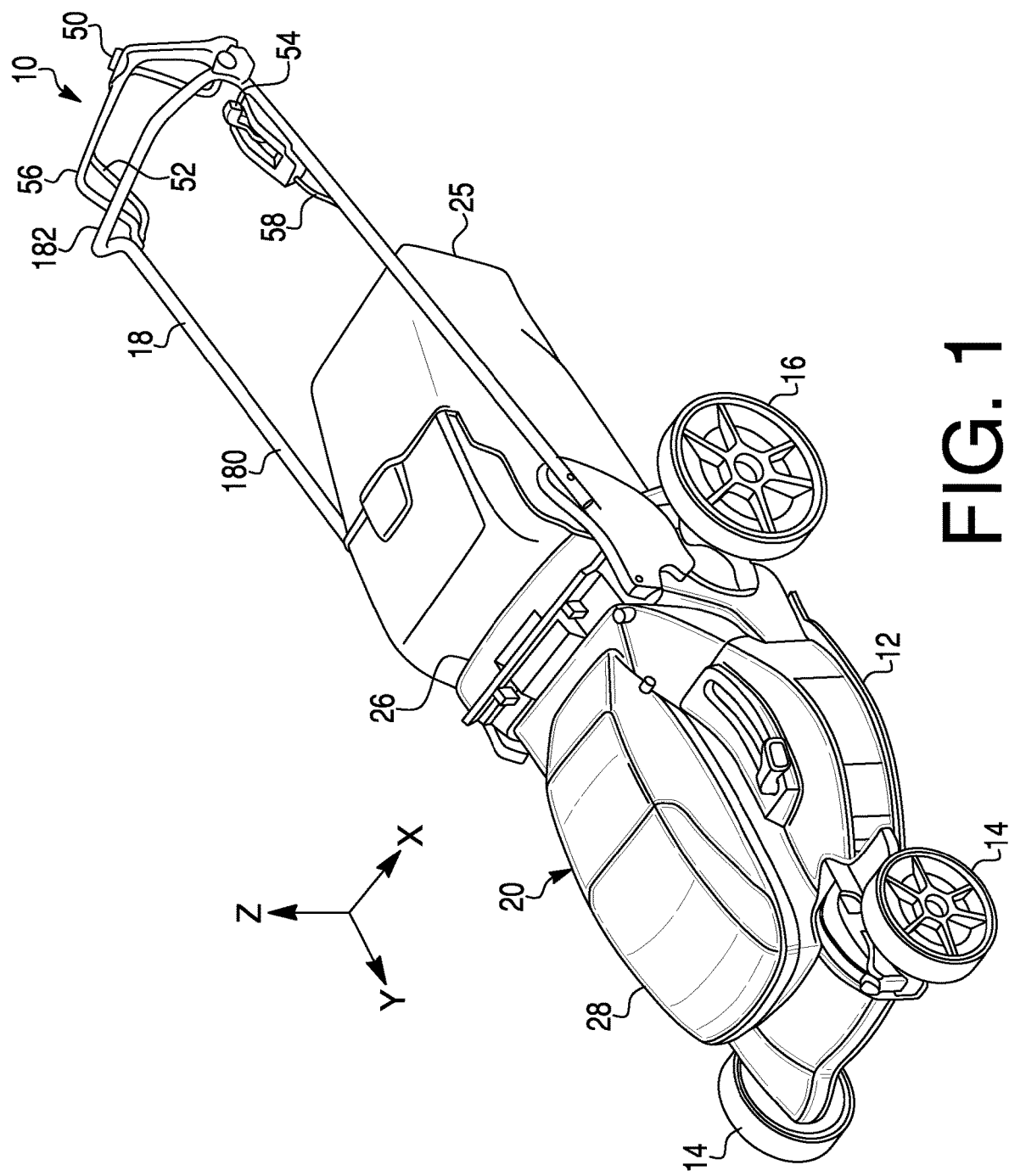
FIG. 1 is a perspective view of a lawnmower made in accordance with principles of the disclosed subject matter.
Figure 2:
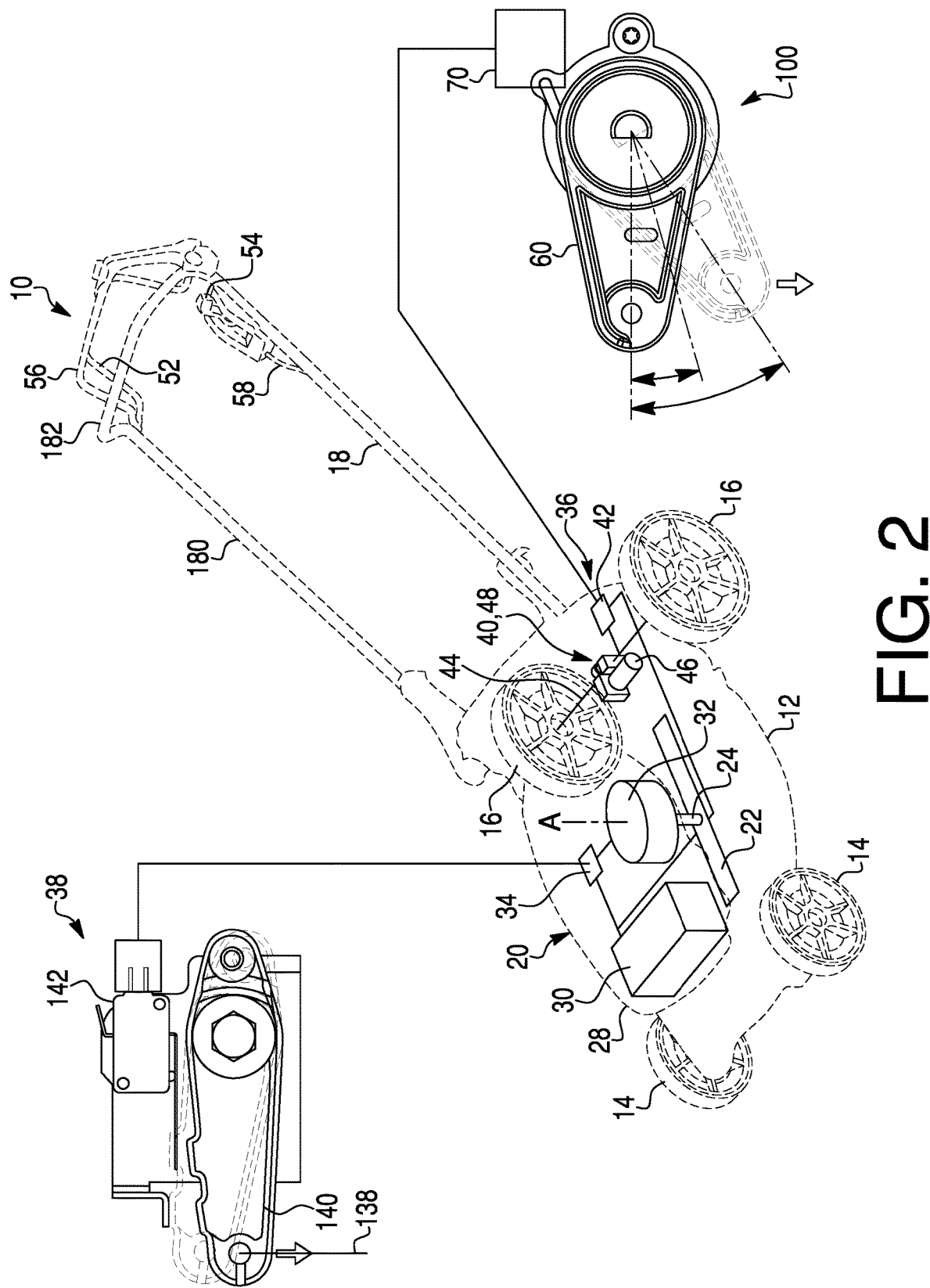
FIG. 2 is a perspective schematic view of a drive assembly and a control system for operating the lawnmower of FIG. 1, with exterior portions of the lawnmower shown in phantom.

FIG. 1 illustrates an embodiment of a lawnmower 10 configured as a walk-behind self-propelled machine. The lawnmower 10 can include a cutter housing 12, a pair of front wheels 14, a pair of rear wheels 16, a handle 18 and a power source assembly 20. The rear wheel 16 on the right side of the lawnmower is obstructed from view in FIG. 1 by the cutter housing 12. FIG. 2 shows the right rear wheel 16 in phantom.

The lawnmower 10 can include a clutch lever 52 and a speed lever 54 that can be connected to a cable 58 which is
} connected to a clutch arm 60 that actuates a hall sensor 70. Additionally, as the speed control levers (clutch lever 52 and speed lever 54) are manipulated incrementally, the hall sensor 70 is moved incrementally, and continually responding to the change.

Referring to FIG. 2, the lawnmower 10 can include a blade 22 and a blade shaft 24 connected to each of the blade 22 and the power source assembly 20. The power source assembly 20 can be configured to selectively rotate the blade shaft 24 and the blade 22 in the cutter housing 12 about a blade axis A. The blade shaft 24 can be referred to as a component of the power source assembly 20. Alternatively, the blade shaft 24 can be referred to as a component that is connected to and driven by the power source assembly 20. A motor housing 90 has been omitted from FIG. 2 for clarity.

The cutter housing 12 can be referred to as a mower deck or as a cutter deck or as a deck. Referring to FIG. 1, the cutter housing 12 can include an opening at a rear end 26 of the cutter housing 12. The lawnmower 10 can include a collection bag 25 that can be selectively attached to and detached from the rear end 26. The collection bag can be in communication with the opening such that vegetation clippings produced by the blade 22 can be collected in the collection bag.

FIG. 2 schematically illustrates exemplary components of the power source assembly 20 and the drive assembly 36. The power source assembly 20 can include a housing 28 (shown in phantom), a battery pack 30, a blade motor 32, a blade motor driver 34, a drive assembly 36 and a blade control assembly 38. Referring to FIGS. 1 and 2, the housing 28 can contain the battery pack 30, the blade motor 32 and the blade motor controller 34. The drive assembly 36 can be spaced away from the housing 28. The housing 28 can be selectively opened to allow access to the battery pack 30.

The battery pack 30 can include at least one battery cell and a case that houses the at least one battery cell. The battery cell can be configured to store electricity and supply electricity to the blade motor 32. The battery pack 30 can be fixed within the housing 28 or removable from the housing 28 for external charging.

The blade motor 32 can be a direct current electric motor or an alternating current electric motor. Embodiments can include a blade motor 32 that is configured as a direct current outer rotor motor that includes an inner stator and an outer rotor. The blade motor 32 can include one or more sensors that provide the blade motor driver 34 with information regarding the temperature, rotational speed, power output, etc., of the blade motor 32. The outer rotor of the blade motor 32 can be directly connected to the blade shaft 24 in any appropriate manner such that the blade motor 32 can cause the blade shaft 24 to rotate.

The blade motor driver 34 can be in electrical communication with each of the battery 30 and the blade motor 32. The blade motor driver 34 can be configured to convert power from the battery pack 30 into output power supplied to the blade motor 32. The blade motor driver 34 can be configured to monitor the operational conditions of the blade motor 32 and the battery pack 30. The blade motor driver 34 can also be configured to control the voltage and/or current output by the battery pack 30 based on the operational conditions of the blade motor 32 and the battery pack 30 switching one or more power transistors to adjust the supply of electrical power to the blade motor 32.

The blade motor driver 34 can also be configured to control the voltage or current output by the battery pack 30, and to supply the voltage or current to the blade motor 32 based on one or more inputs to the blade control assembly 38 by the operator of the electric lawnmower 10 using the one or more power transistors.

The blade motor driver 34 can be in electrical communication with each of the blade control assembly 38, the blade motor 32 and the battery pack 30. The blade motor driver 34 can be configured to initiate, adjust or terminate supply of voltage or current from the battery pack 30 to the blade motor 32 based on inputs received from the blade control assembly 38, the battery pack 30 and the blade motor 32. The blade motor driver 34 can also be configured to regulate the charging of the battery cell(s) of the battery pack 30.

The blade control assembly 38 (or portion thereof) can be mounted on the handle 18 in any appropriate position and orientation on the handle 18 that can facilitate actuation by an operator of the lawnmower 10. The blade control assembly 38 can be configured to actuate one or more operational features of the lawnmower 10. In one exemplary embodiment, the blade control assembly 38 can be configured to cause the blade motor driver 34 to energize the blade motor 32 and rotate the blade 22. The blade control assembly 38 can be electrically connected to the blade motor driver 34. The blade control assembly 38 can include a blade switch 50 configured to selectively place the power source assembly 20 in an "ON" state in which the blade motor driver 34 is electrically connected to the battery pack 30, or in an "OFF" state in which the blade motor driver 34 is electrically disconnected from the battery pack 30.

The blade switch 50 can be disposed at any appropriate location on the handle 18. When the blade switch 50 is actuated, the blade lever 56 is readied to be able to actuate a blade cable 138. That is, when the blade switch 50 is unactuated the blade lever 56 can pivot relative to the handle 18 but the blade 22 will not be driven. When the blade switch 50 is actuated, the blade lever 56 can pivot relative to the handle 18 and can cause actuation of the blade cable 138 to drive the blade 22. When the blade switch 50 is actuated by pressing the blade switch 50, a hook member can move and can grab or attach to a pin and an arm to which the blade cable 138 is connected to. Thus, with the hook member connected, when the blade lever 56 is actuated, the blade cable 138 moves.

The blade control assembly 38 can include a blade lever 56 configured to selectively drive the blade motor 32 and rotate the blade 22. The blade lever 56 can be pivotably mounted to the handle 18. When the blade lever 56 is actuated by pivoting relative to the handle 18, the blade lever 56 pulls the blade cable 138 that is attached to a brake arm 140 away from a redundancy switch 142 in electrical communication with the blade motor driver 34. When the redundancy switch 142 and the brake arm 140 are separated and no longer in direct contact, the redundancy switch 142 can send a signal to the blade motor controller 34 to start the blade motor 32.

The drive assembly 36 can be mounted to the cutter housing 12 at a position that is underneath the cutter housing 12. The drive assembly 36 can include a drive transmission 40 and a transmission control system 100. The transmission control system 100 can include the clutch lever 52, the speed lever 54, the cable 58, the hall sensor 70, a stopper 62, a spring 64, and the propulsion motor driver 42. The propulsion motor driver 42 can be in electrical communication with each of the battery pack 30 and the drive transmission 40. A drive shaft 44 can be connected to each of the drive transmission 40 and the rear wheels 16 in any appropriate manner such that the drive transmission 40 can cause the drive shaft 44 to rotate, which in turn can cause the rear wheels 16 to rotate.

The drive transmission 40 (also referred to as the electric drive transmission) can also include a propulsion motor 46 and a gear transmission 48 connecting the propulsion motor 46 to the drive shaft 44. The propulsion motor 46 can be a direct current electric motor or an alternating current electric motor. The propulsion motor 46 can include one or more sensors that provide the blade motor driver 34 with information regarding the temperature, rotational speed, power output, etc., of the propulsion motor 46.

The propulsion motor driver 42 can be in electrical communication with each of the battery pack 30, the propulsion motor 46, and the hall sensor 70. The propulsion motor driver 42 can be configured to convert power from the battery pack 30 into output power supplied to the propulsion motor 46. The propulsion motor driver 42 can be configured to monitor the operational conditions of the propulsion motor 46 and the battery pack 30. The propulsion motor driver 42 can be configured to control the voltage or current output by the battery pack 30 based on the operational conditions of the propulsion motor 46 and the battery pack 30 by switching one or more power transistors to adjust the supply of electrical power to the propulsion motor 46.

The propulsion motor driver 42 can also be configured to control the voltage or current output by the battery pack 30, and to supply the voltage or current to the propulsion motor 46 based on one or more inputs by the operator of the electric lawnmower 10 using the one or more power transistors.

The propulsion motor driver 42 can be configured to initiate, adjust or terminate supply of voltage or current from the battery pack 30 to the propulsion motor 46 based on inputs received from the battery pack 30, the propulsion motor 46, the hall sensor 70, and one or more input structures mounted on the handle 18 or other appropriate location. Further details of the one or more input structures are described below.

Figure 3:
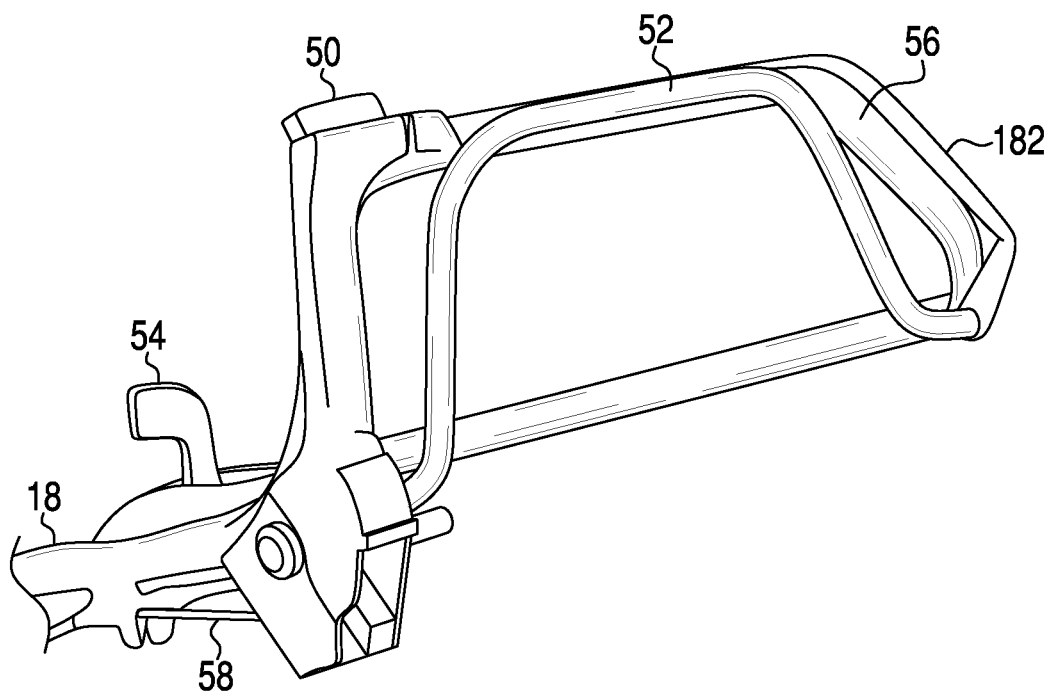
FIG. 3 is a perspective view of the handle of the lawnmower of FIG. 1.

The lawnmower 10 can include at least one input structure mounted on the handle 18 (or other location) that is configured to facilitate control of the drive assembly 36 by the operator of the lawnmower 10. Referring to FIGS. 1-3, the input structure can include the speed lever 54 and the clutch lever 52.

The speed lever 54 can be mounted on the handle 18. The speed lever 54 can be configured to permit the operator of the lawnmower 10 to set a maximum speed value from a range of possible maximum speed values at which the drive assembly 36 will propel the lawnmower 10.

The clutch lever 52 can be pivotally mounted on the handle 18. The clutch lever 52 can be configured to permit the operator of the lawnmower 10 to adjust the speed at which the drive assembly 36 propels the lawnmower 10 between zero and the maximum speed set via the speed lever 54. The clutch lever 52 can also be configured to allow the operator of the lawnmower to continuously vary the speed at which the drive assembly 36 propels the lawnmower. The clutch lever 52 can be a blade brake lever such that the clutch lever 52 causes a brake assembly and/or the blade motor 32 to stop rotation of the blade 22 in certain conditions.

The clutch arm 60 can be connected to the cable 58 that is connected to the clutch lever 52 and the speed lever 54. The clutch arm 60 can be disposed near the rear wheels 16 and adjacent the motor housing 90. The clutch arm 60 can be configured to actuate the hall sensor 70 to change a speed at which the drive assembly 36 will propel the lawnmower 10. Operation of the clutch arm 60 will be discussed in detail below.

Referring to FIG. 1, the lawnmower 10 can include an X-axis, a Y-axis and a Z-axis. The X, Y, and Z-axes are displaced away from the lawnmower 10 for clarity of the drawing. However, the origin O is intended to be located on the drive shaft 44 and equidistant from each of the rear wheels 16.

FIG. 3 is a perspective view of the handle 18 of the lawnmower 10 including the blade switch 50, blade lever 56, the speed lever 54, the clutch lever 52, and the cable 58. The handle 18 can include a pair of arms 180 and a u-shaped portion 182.

The blade switch 50 can be a single-action button spaced away from the blade lever 56. When the blade switch 50 is actuated, the blade lever 56 is readied to be actuated. The blade lever 56 can pivot toward the handle 18 to actuate. That is, the blade lever 56 can pivot toward the U-shaped portion 182 of the handle 18 to actuate.

The speed lever 54 can be disposed on one of the pair of arms 180 of the handle 18 or at any appropriate location on the handle 18. The speed lever 54 can be pivotably attached to the handle 18. The speed lever 54 can be connected to the cable 58 such that a position of the speed lever 54 can correspond to a maximum range of actuation of the clutch arm 60. That is, the speed lever 54 can set the total allowable cable stroke of the cable 58. As a result, the speed lever 54 can set and/or control a maximum speed setting of the drive transmission 40.

The clutch lever 52 can be pivotably attached to each one of the pair of arms 180 of the handle 18 and span across the u-shaped portion 182. The clutch lever 52 can be attached to the cable 58. When the clutch lever 52 is actuated and pivots relative to the handle 18, the cable 58 pulls the clutch arm 60 adjusting a voltage signal (also referred to as the speed signal) of the hall sensor 70. The clutch lever 52 can be incrementally actuated such that incremental movement of the clutch lever 52 can cause incremental movement of the clutch arm 60 to move the hall sensor 70 a corresponding incremental amount. The clutch lever 52 can have a bias force acting on the clutch lever 52 (by a spring or any other appropriate bias mechanism) so that the clutch lever 52 returns to an unactuated position when an operator releases hold of the clutch lever 52.

The cable 58, also referred to as the speed cable or clutch cable, can be attached to the speed lever 54, the clutch lever 52, and the clutch arm 60. The cable 58 can transmit incremental movement of the clutch lever 52 to the clutch arm 60 and can cause the clutch arm 60 to move a corresponding incremental amount to move the hall sensor 70.

Figure 4:
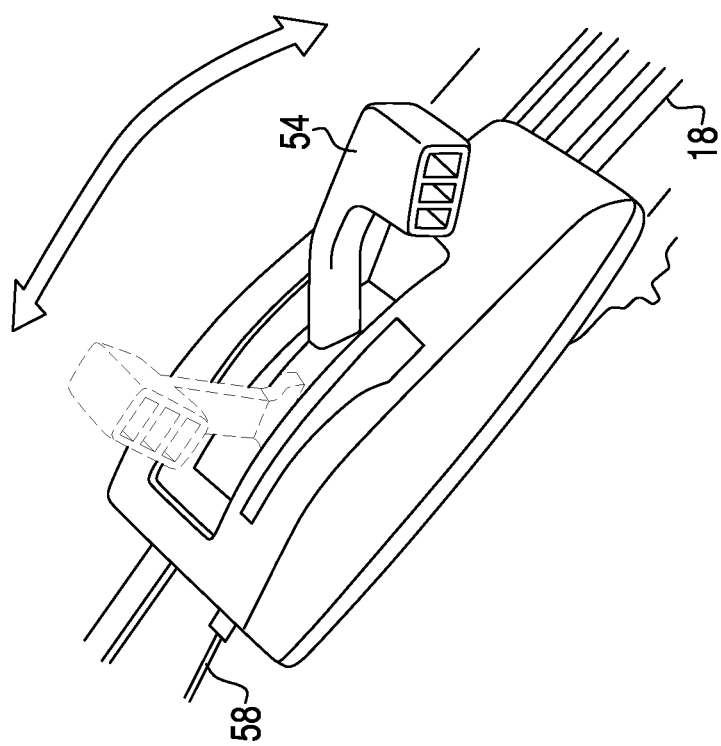
FIG. 4 is a perspective view of a speed lever on one of the pair of arms of the handle of FIG. 3.

FIG. 4 is a perspective view of the speed lever 54 disposed on one of the pair of arms 180 of the handle 18. The speed lever 54 can be movable between a first position and a second position (shown in phantom). When the speed lever 54 moves, the cable 58 can move so as to set a total allowable cable stroke. The total allowable cable stroke corresponds to the maximum speed that the electric drive transmission 40 can achieve when the clutch lever 52 is fully actuated. That is, the speed lever 54 sets the maximum range of variable speeds that the electric drive transmission 40 can output based on incremental actuation of the clutch lever 52.

When the speed lever 54 is set in the first position, the electric drive transmission 40 can output a range of speeds up to an operational minimum speed set for the lawnmower 10. The operational minimum speed can be zero corresponding to a configuration in which the lawnmower 10 does not propel unless the speed lever 54 has been moved away from the first position. Alternatively, the operational minimum speed can be any value greater than zero corresponding to a speed at which the electric drive transmission 40 will output when the clutch lever 52 has been actuated. When the speed lever 54 is in the second position, the electric drive transmission 40 can output a range of speeds up to the operational maximum speed set for the lawnmower 10. When the speed lever 56 is in any position between the first position and the second position, the electric drive transmission 40 can output a speed in a range between zero and the maximum speed corresponding to the position of the speed lever 54.

Figure 5:
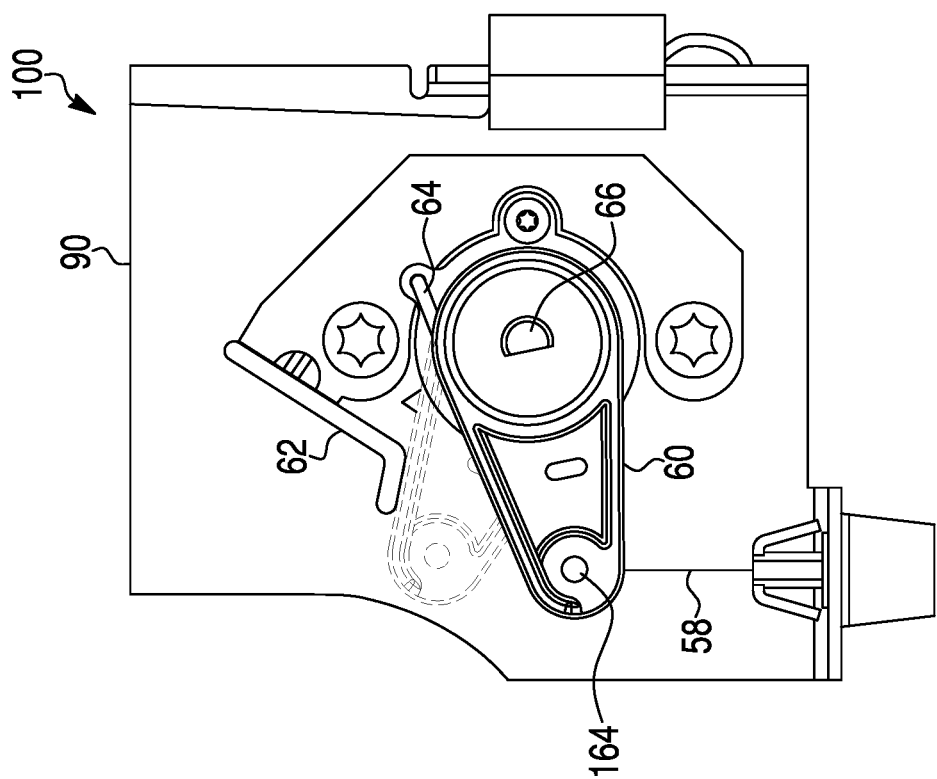
FIG. 5 is a side view of the clutch arm, the stopper, and the spring adjacent to the motor housing of the lawnmower of FIG. 1.

For example, referring to FIGS. 4 and 5, the clutch arm can have a first position referred to as a resting position and a second position referred to as a maximum speed position. The second position of the speed lever 54 can correspond to the maximum speed position of the clutch arm 60. The cable 58 can transmit movement of the speed lever 54 to the clutch arm 60 so that the maximum speed position of the clutch arm 60 can be set by the corresponding second position of the speed lever 54. Additionally, the cable 58 can transmit movement of the clutch lever 52 to the clutch arm 60 so that the clutch arm 60 can move incrementally between the resting position and the maximum speed position to obtain a continuous variable speed control of the electric drive transmission 40.

FIG. 5 is a side view of the clutch arm 60, the stopper 62, and the spring 64 adjacent to the motor housing 90. The clutch arm 60 is shown in the maximum speed position and the resting position is shown in phantom.

The clutch arm 60 can be movable between the resting position and the maximum speed position to actuate the hall sensor 70 to change a speed of the electric drive transmission 40. The clutch arm 60 can pivot relative to the motor housing 90 about a shaft 66. The cable 58 can attach to the clutch arm 60 by a fastener 164 that is spaced away from the shaft 66. The cable 58 can transfer motion from the clutch lever 52 to the clutch arm 60 to pull the clutch arm between the resting position and the maximum speed position. For example, as shown, the cable 58 can pull the clutch arm 60 in a downward direction to pivot the clutch arm counter-clockwise when viewed from the perspective of FIG. 5.

The resting position can correspond to when the clutch lever 52 is unactuated. The maximum speed position can correspond to when the clutch lever 52 is fully actuated.

The stopper 62 can be fixed to the motor housing 90 and adjacent the clutch arm 60. The stopper 62 can abut the clutch arm 60 when the clutch arm 60 is in the resting position. The stopper 62 can limit or prevent movement of the clutch arm 60 away from the maximum speed position when the clutch arm 60 is in the resting position.

The spring 64 can be disposed against the clutch arm 60 and can exert a spring bias force on the clutch arm 60 biasing the clutch arm toward the resting position. The spring 64 can cause the clutch arm 60 to return to the resting position when an operator releases the clutch lever 52.

Figure 6:
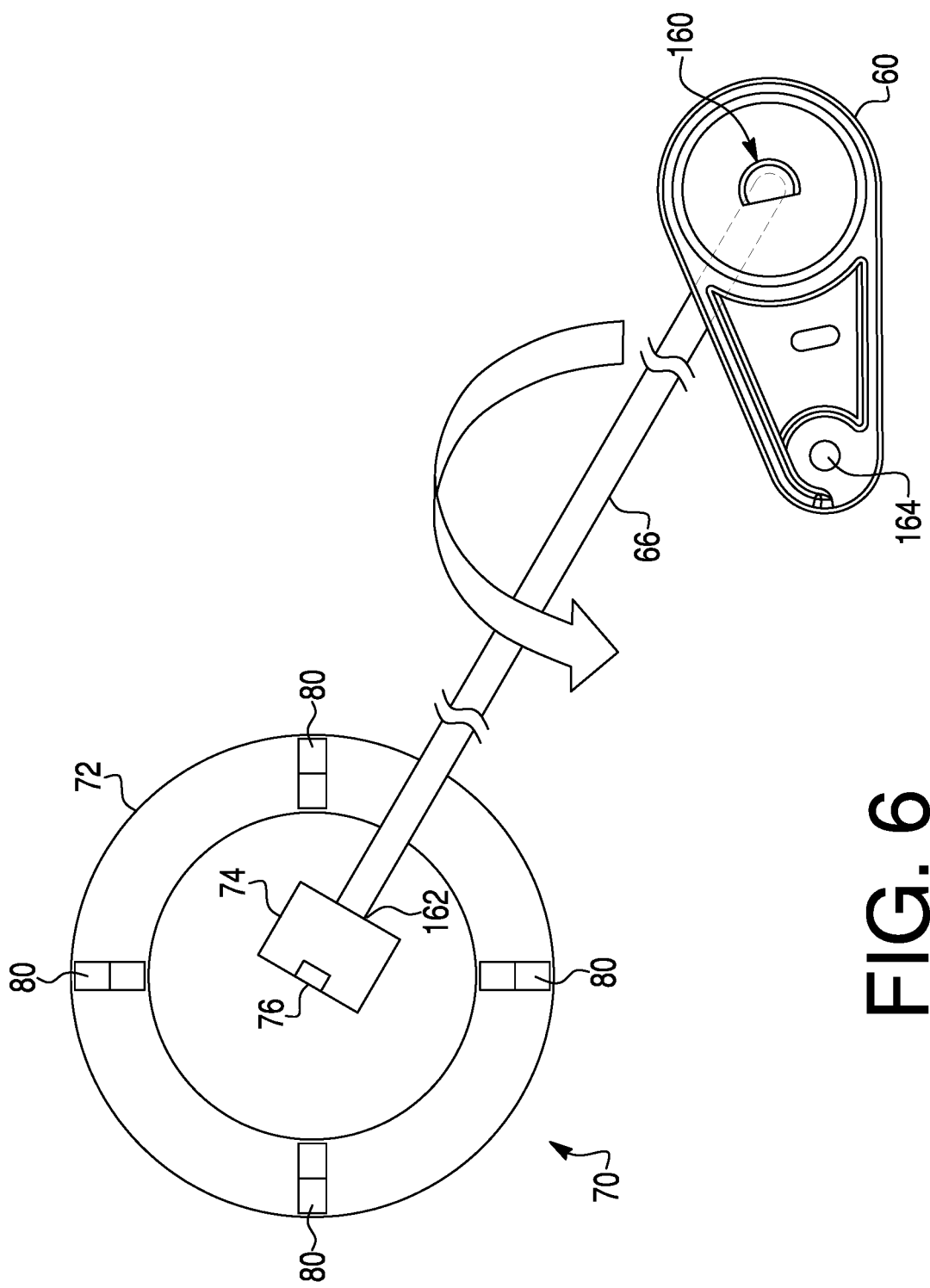
FIG. 6 is a perspective view of the clutch arm and shaft attached to a hall sensor 70 in the lawnmower of FIG. 1.

FIG. 6 is a perspective view of the clutch arm 60 and shaft 66 attached to the hall sensor 70. The shaft 66 can be fixed to the clutch arm 60 at a first end 160 and rotate when the clutch arm 60 pivots. At a second end 162 of the shaft 66 the hall sensor 70 can be attached.

The hall sensor 70 can be in electrical communication with the propulsion motor driver 42. The hall sensor 70 can be configured to incrementally vary the speed signal transmitted to the propulsion motor driver 42 when the hall sensor 70 moves. The speed signal can be a voltage signal or any appropriate signal for indicating speed control to the propulsion motor driver 42. The hall sensor 70 can include a fixed member 72 and a movable member 74. The hall sensor 70 can detect a magnetic field around the fixed member 72. The hall sensor 70 can detect changes in the magnetic field when the movable member 74 moves around or near the fixed member 72. For example, in FIG. 5, the fixed member 72 can be a stationary disc and can include a plurality of magnets 80 disposed on the disc. The movable member 74 can be fixed to the shaft 66 and can move when the shaft 66 rotates. The fixed member 72 can include a sensor 76 such as an encoder. The sensor 76 can be in direct electrical communication with the propulsion motor driver 42 connected to a sensor board that is in electrical communication with the propulsion motor driver 42.

The clutch arm 60 can pivot to cause the shaft 66 to rotate. Rotation of the shaft 66 can cause movement of the sensor 76 which causes a change in the magnetic field detected by the sensor 76. The change in magnetic field detected by the sensor 76 can cause a change in the voltage signal of the hall sensor 70 output to the propulsion motor driver 42.

Figure 7:
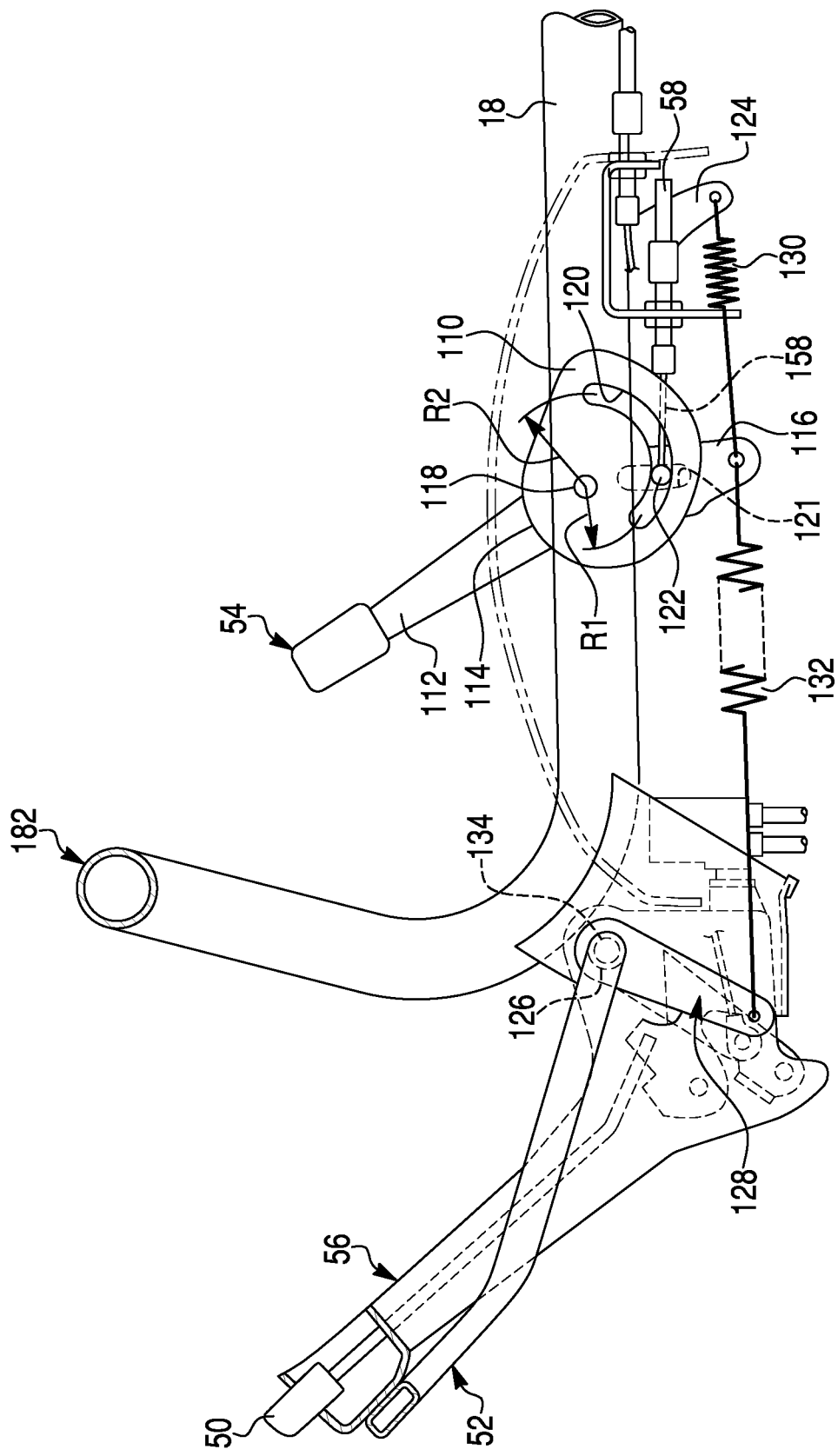
FIG. 7 is a partial side view of a left rear portion of the handle and speed lever of the lawnmower of FIG. 1.

FIG. 7 is a view of the area surrounding the left rear portion of the handle 18 including the speed lever 54. As shown in FIG. 7, the speed lever 54 can include a nearly disk-shaped disk portion 110 and an operating lever 112 that extends upward from the upper end 114 of the disk portion 110. When the disk portion 110 is viewed from the front surface thereof, the disk portion 110 is formed in a forked shape (bifurcate shape), and a speed lever arm 116 is disposed in the space between the forks.

The disk portion 110 and the speed lever arm 116 are both attached to a speed lever mounting bracket of the handle 18 via a support pin 118 so as to be able to swing forward and backward. The speed lever arm 116 is a narrow elongated member that extends further downward than the position of the support pin 118. The disk portion 110 and the speed lever arm 116 can swing forward and backward relative to each other.

The disk portion 110 has a narrow elongated first guide hole 120 having a shape that curves about the support pin 118. The radius of the first guide hole 120 is set so as to gradually increase from the rear end portion to the front end portion. In other words, the radius R2 of the front end portion of the guide hole 120 is larger than the radius R1 of the rear end portion of the first guide hole 120 (R1<R2).

The speed lever arm 116 has a second guide hole 121 that is narrow and elongated downward substantially orthogonal to the first guide hole 120.

An inner cable 158 of cable 58 has a connecting pin 122 at the rear end thereof. The connecting pin 122 is fitted into both the first guide hole 120 and the second guide hole 121. The front end portion in the inner cable 158 of the cable 58 is connected to the clutch arm 60.

The handle 18 can be provided with a support arm 124. The support arm 124 can be disposed in a position that is further forward than the speed lever arm 116. A horizontal rod 126 in the clutch lever 52 can be provided with a clutch travel arm 128. The clutch travel arm 128 can be disposed in a position that is further to the rear than the speed lever arm 116 and can swing forward and backward along with the clutch lever 52 about the support pin 134.

A first tension spring 130 (return spring) can be provided between the support arm 124 and the distal end portion of the speed lever arm 116. The distal end portion of the speed lever arm 116 is also connected to the clutch travel arm 128 via a second tension spring 132. As described above, the radius of the first guide hole 120 is set so as to gradually increase from the rear end portion to the front end portion.

When the speed lever 54 is swung forward, the connecting pin 122 is moved downward, and the inner cable 158 is therefore pulled further to the rear. The maximum speed of the drive transmission 40 can therefore be increased. As a result, the travel speed of the lawnmower 10 increases.

When the speed lever 54 is swung to the rear, the connecting pin 122 moves upward. Thus, there is a reduction in the force with which the inner cable 158 is pulled by the speed lever 54. The output speed of the drive transmission therefore decreases. As a result, the travel speed of the lawnmower 10 decreases.

The travel speed of the lawnmower 10 thus changes according to the amount of swing of the speed lever 54.

Figure 8:
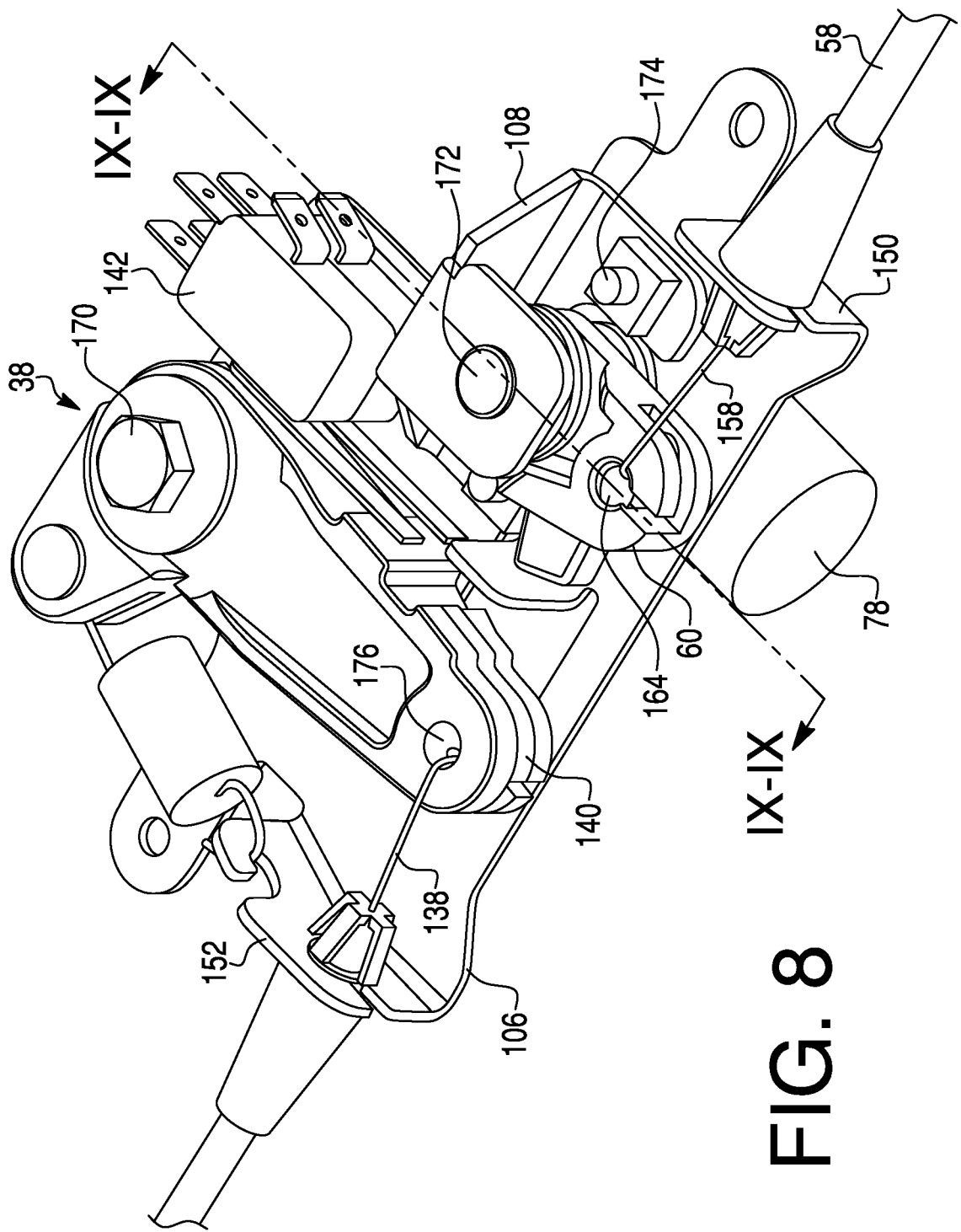
FIG. 8 is a perspective view of a mounting plate for a blade control assembly and clutch arm of the lawnmower of FIG. 1.

FIG. 8 is a perspective view of an embodiment that includes a mounting plate 106 for the blade control assembly 38 and the clutch arm 60. The mounting plate 106 can include mounting locations for the brake arm 140 and the clutch arm 60. The brake arm 140, clutch arm 60, and redundancy switch 142 can be attached to a first side of the mounting plate 106. The brake arm 140 can be pivotably attached to the mounting plate 106 with fastener 170. The clutch arm 60 can be pivotably attached to the mounting plate 106 and centered about cylinder 172. Hall sensor mounting bracket 108 can be attached to the mounting plate 106 via fastener 174. On the second side of the mounting plate 106, opposite the first side on which the brake arm 140 and clutch arm 60 are mounted, the hall sensor 70 can be disposed. A shaft 166 (see FIG. 9) can extend through an opening in the mounting plate 106 and attach to the hall sensor 70.

When attached to the mounting plate, the fastener 164 of the clutch arm 60 and a fastener 176 can be aligned along a direction in which cables 138 and 58 extend. The fastener 170 and cylinder 172 can be spaced apart from each other such that the brake arm 140 and the clutch arm 60 each pivot about a separate respective axis. Fasteners 164 and 176 can include any appropriate fastener, including but not limited to, a hole in the clutch arm 60 and/or the brake arm 140 in which barrel end fittings attached to the ends of cables 158 and 138 drop into the holes of the fasteners 164 and 176, respectively. When the barrel end fittings are secured in the hole, it can allow actuation of the respective clutch arm 60 and/or brake arm 140 using the cables 158 and 138, respectively.

The mounting plate 106 can include first and second cable attachments 150, 152 that extend orthogonal to and away from the first side of the mounting plate 106. Cable attachment portion 152 can include an opening to fasten to blade cable 138 and cable attachment portion 150 can include an opening to fasten to cable 58. Cable attachment 150 and 152 can be disposed on opposite sides of the mounting plate 106 in the direction in which the cables 58 and 138 extend.

Figure 9:
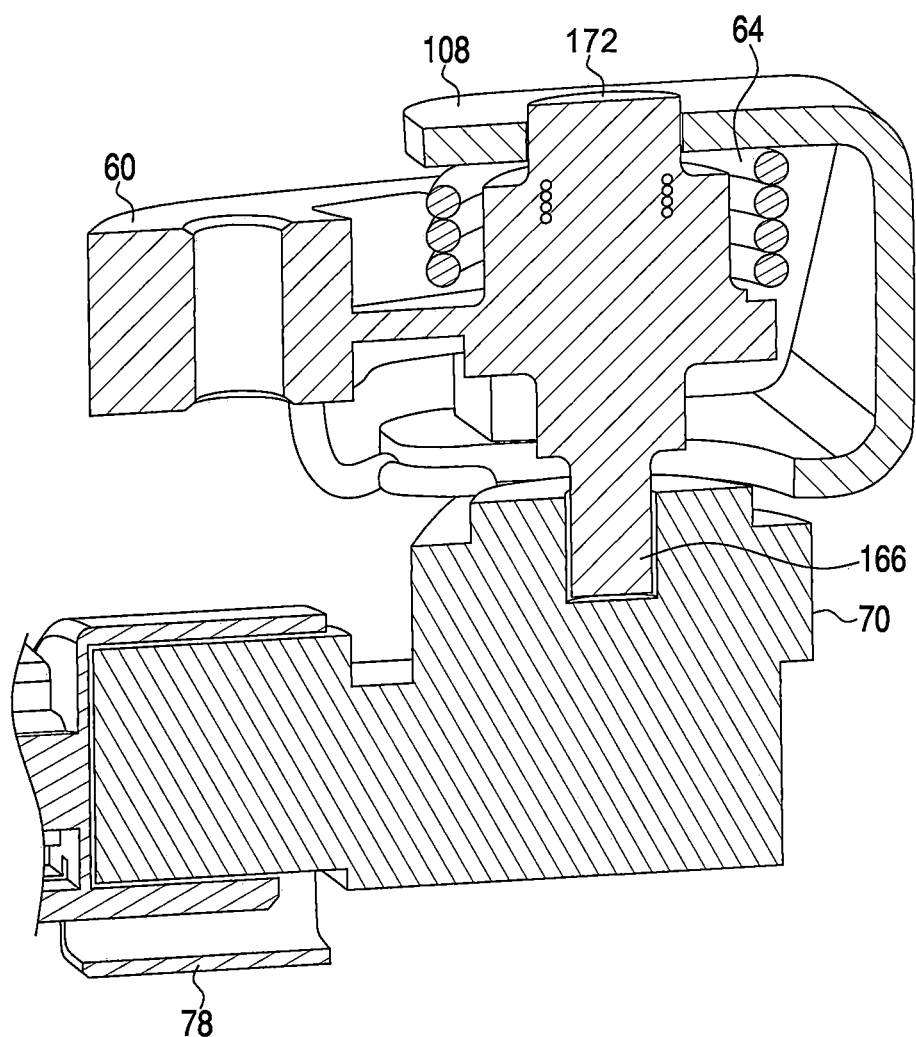
FIG. 9 is a sectional view of the clutch arm and hall sensor taken along line IX-IX of FIG. 8.

FIG. 9 is a sectional view of the clutch arm 60 and hall sensor 70 of FIG. 8 taken along the IX-IX line with the mounting plate 106 omitted for clarity. The clutch arm 60 can be supported within mounting bracket 108 and pivotably attached to the hall sensor 70 via shaft 166. The clutch arm 60 can also be attached to spring 64 such that a spring bias force acts on the clutch arm 60 biasing it to a first position. Shaft 166 can extend from the clutch arm 60 into hall sensor 70. The shaft 166 can extend into a notch in the hall sensor 70 such that when the clutch arm 60 pivots, the shaft 166 rotates and causes an internal shaft of the hall sensor 70 to pivot. Hall sensor 70 can include a hall sensor connector 78 in electrical communication with the propulsion motor driver 42. The body of the hall sensor 70 can be bolted to mounting plate 106 and hall sensor mounting bracket 108. The pivoting of the internal shaft of the hall sensor 70 can cause a change in magnetic force in the hall sensor 70 that can cause a change in output of the voltage signal through hall sensor connector 78 to the propulsion motor driver 42.

The clutch arm 60 may not be attached to the bracket 108 in some embodiments. The clutch arm 60 can be configured as a support that the arm can rotate in to make sure that the shaft doesn't lean sideways. The arm can be attached to the sensor/sensor shaft which rotates. The bracket 108 can be configured so that the arm is supported on a top side. The sensor body can be bolted through bracket 108 and 106. The hall sensor body may not pivot relative to the bracket 106 or 108. The clutch arm 60 can rotate an internal shaft of the hall sensor. When shaft 166 rotates, this can cause the change in voltage, and then an output voltage can be sent through the connector 78.

Electrical communication lines (not numbered) can connect the battery pack 30, blade motor 32, blade motor driver 34, propulsion motor driver 42, propulsion motor 46, hall sensor 70, to each other and any of the switches in any appropriate manner. Electrical communication can be either one-way communication or two-way communication and can be networked or not networked. The sensor 76 can be configured with hardware, with or without software, to perform the assigned task(s). The sensor 76 can be configured as a smart sensor such that the sensor 76 can process the raw data collected by the sensor 76 prior to transmission to the propulsion motor driver 42, or the sensor 76 can be configured as a simple sensor that passes the raw data directly to the propulsion motor driver 42 without any manipulation of the raw data. The sensor 76 can be configured to send data to the propulsion motor driver 42, with or without a prompt from the propulsion motor driver 42.

While certain embodiments of the presently disclosed subject matter are described above, it should be understood that the presently disclosed subject matter can be embodied and configured in many different ways without departing from the spirit and scope of the presently disclosed subject matter.

Embodiments are disclosed above in the context of the shaft 66 shown in FIG. 6 and in the context of shaft 166 shown in FIG. 9. Shaft 66 is shown in FIG. 6 as a schematic representation of the shaft. Shaft 166 shown in FIG. 9 can be one of many possible embodiments of the shaft 66.

Embodiments are disclosed above in the context of the hall sensor 70 shown in FIG. 5 in which the fixed member 72 can be a stationary disc and can include at least one magnet or the plurality of magnets 80 disposed on the disc and the movable member 74 can be fixed to the shaft 66 and can move when the shaft 66 moves. However, embodiments are intended to include or otherwise cover any type of rotary sensor. For example, the fixed member 72 can be the disc or it can be the sensor 76. The movable member 74 can be the sensor 76 or it can be the disc. The plurality of magnets 80 can be disposed on either the movable member 74 or the fixed member 72. The movable member 74 can be a disc having a plurality of openings wherein the disc is disposed between a stationary sensor and a stationary magnet such that rotation of the disc can cause a disruption of the magnetic field between the magnet and the sensor as the openings within the disc rotate through the magnetic field. Additionally, the sensor 76 can output the voltage signal to the propulsion motor driver 42 from any appropriate structure and/or signal generator located on either the fixed member 72, the movable member 74, or any other appropriate location.

Embodiments are intended to include any appropriate type of magnet for use with a hall sensor including but not limited to disc magnets, cylindrical magnets, flat magnets, or any appropriate magnet that can induce a magnetic field.

Embodiments are disclosed above in which the propulsion motor 46 can be an electric motor. However, embodiments are also intended to include or otherwise cover power equipment apparatus that can include an internal combustion engine, or a hybrid of an internal combustion engine and an electric motor.

Embodiments are disclosed above in which the hall sensor 70 is disposed on a second end of the shaft 66. However, embodiments are also intended to include or otherwise cover the hall sensor 70 located anywhere within the housing 28 of the lawnmower 10 such that actuation of the clutch arm 60 can cause the movable member 74 of the hall sensor 70 to move and/or detect a change in magnetic field corresponding to the actuation of the clutch arm 60.

The handle 18 is shown as a typical U-shaped handle for a walk behind mower, but can be configured as a steering wheel or dual levers for tractor or ZTR mowers, respectively. The handle 18 can also be incorporated into or configured as a dashboard of a mower device that might be autonomously controlled or steered.

Embodiments are disclosed above which refer to a speed, drive speed, speed of the electric drive transmission 40, or speed of the drive assembly 36. Any of the speeds can generally refer to that speed at which the component parts operate to provide a ground speed of the lawnmower 10. The speed signal can be any appropriate signal or measurement to achieve a desired ground speed of the mower 10 whether based on the individual or aggregate output of the propulsion motor 46, the electric drive transmission 40, the drive assembly 36, and/or the drive shaft 44.

The motor housing 90, the clutch arm 60, and the hall sensor 70 can be formed in various manners and still fall within the scope of the disclosed subject matter. For example, the shaft 66 can extend from the clutch arm 60 to the hall sensor 70 and enter the motor housing 90 through an opening 92. The motor housing 90 can surround or house the propulsion motor 46, the propulsion motor driver 42, the hall sensor 70, and/or any other appropriate components of the drive assembly 36. The fixed member 72 and the movable member 74 can each be sealed within the motor housing 90 to allow for isolation from debris, weather, moisture, and any other contaminates.

What is claimed is:

1. A transmission control system for a lawnmower having a battery and an electric drive transmission including a propulsion motor and a propulsion motor driver, the control system comprising:
    a clutch lever;
    a speed lever;
    a cable including a first end and a second end, the first end is connected to the clutch lever and the speed lever;
    a hall sensor in electrical communication with the propulsion motor driver; and
    a clutch arm connected onto the second end of the cable and connected to the hall sensor, the clutch arm moves the hall sensor to change a speed of the electric transmission when the cable moves the clutch arm.

2. The transmission control system of claim 1, wherein the clutch lever and the clutch arm are configured such that the cable transmits incremental movement of the clutch lever to the clutch arm and causes the clutch arm to move a corresponding incremental amount to move the hall sensor.

3. The transmission control system of claim 2, wherein the hall sensor is configured to incrementally vary a speed signal transmitted to the propulsion motor driver when the hall sensor moves.

4. The transmission control system of claim 3, wherein the clutch arm has a first position and a second position and is movable between the first position and the second position, the first position is different than the second position,
    the cable is configured to transmit movement of the clutch lever to the clutch arm so the clutch arm moves incrementally between the first position and the second position, and
    the cable is configured to transmit movement of the speed lever to the clutch arm so that the second position of the clutch arm corresponds to a position of the speed lever.

5. The transmission control system of claim 4, further comprising:
    a stopper disposed adjacent to the clutch arm, the stopper configured to contact the clutch arm and prevent the clutch arm from pivoting away from the second position when the clutch arm is in the first position.

6. The transmission control system of claim 5, further comprising:
    a spring disposed against the clutch arm exerting a spring bias force on the clutch arm biasing the clutch arm toward the first position.

7. A transmission control system for a lawnmower having a battery and an electric drive transmission including a propulsion motor, the control system comprising:
    a propulsion motor driver in electrical communication with the propulsion motor and the battery;
    a clutch lever;
    a cable including a first end and a second end, the first end is connected to the clutch lever;
    a hall sensor in electrical communication with the propulsion motor driver; and
    a clutch arm connected onto the second end of the cable and connected to the hall sensor, the clutch arm moves the hall sensor to vary a speed signal transmitted to the propulsion motor driver when the cable moves the clutch arm.

8. The transmission control system of claim 7, wherein the clutch lever, clutch arm, and cable are configured such that the cable transmits incremental movement of the clutch lever to the clutch arm and causes the clutch arm to move a corresponding incremental amount to actuate the hall sensor,
    the hall sensor configured to continuously output the speed signal to the propulsion motor driver, and vary the output of the speed signal when the hall sensor is actuated.

9. The transmission control system of claim 8, further comprising:
    a motor housing surrounding the propulsion motor, propulsion motor driver, and the hall sensor.

10. The transmission control system of claim 9, further comprising:
    a shaft having a first end and a second end,
        the clutch arm is fixed to the first end of the shaft and the hall sensor is disposed on the second end of the shaft.

11. A lawnmower, comprising:
    a deck;
    a handle extending from the deck;
    an electric motor mounted adjacent the deck;
    a battery electrically connected to the electric motor;
    a blade rotatably supported in the deck;
    a plurality of wheels connected to the deck;
    a drive shaft connected to at least one of the plurality of wheels;

a propulsion motor;

a transmission connecting the propulsion motor to the drive shaft;

a propulsion motor driver in electrical communication with the battery and the propulsion motor;

a clutch lever attached to the handle;

a speed lever attached to the handle;

a cable including a first end and a second end, the first end is connected to the clutch lever and the speed lever;

a hall sensor in electrical communication with the propulsion motor driver; and a clutch arm connected onto the second end of the cable and connected to the hall sensor, the clutch arm moves the hall sensor to change a speed of the transmission when the cable moves the clutch arm.

12. The lawnmower of claim 11, wherein the clutch lever, clutch arm, and cable are configured such that the cable transmits incremental movement of the clutch lever to the clutch arm and causes the clutch arm to move a corresponding incremental amount to move the hall sensor.

13. The lawnmower of claim 12, wherein the clutch arm has a first position and a second position and is movable between the first position and the second position, the first position is different than the second position, the cable is configured to transmit movement of the clutch lever to the clutch arm so the clutch arm moves incrementally between the first position and the second position, and the cable is configured to transmit movement of the speed lever to the clutch arm so that the second position of the clutch arm corresponds to a position of the speed lever.

14. The lawnmower of claim 13, further comprising:

a stopper disposed adjacent to the clutch arm, the stopper configured to contact the clutch arm and prevent the clutch arm from pivoting away from the second position when the clutch arm is in the first position.

15. The lawnmower of claim 14, further comprising:

a spring disposed against the clutch arm exerting a spring bias force on the clutch arm biasing the clutch arm toward the first position.

16. The lawnmower of claim 15, further comprising:

a motor housing adjacent the deck and surrounding the propulsion motor and the propulsion motor driver, the hall sensor, the clutch arm and the stopper are disposed outside the motor housing.

17. The lawnmower of claim 16, further comprising:

a shaft having a first end and a second end, the clutch arm is fixed to the first end of the shaft and the hall sensor is disposed on the second end of the shaft.

18. The lawnmower of claim 17, wherein the hall sensor includes a fixed member and a moving member, the fixed member and the moving member are disposed within the motor housing, and at least one magnet is disposed on one of the fixed member and the moving member and a sensor is disposed on an other of the fixed member and the moving member.

19. The lawnmower of claim 13, wherein the speed lever is spaced away from the clutch lever.

20. A method of using the lawnmower of claim 13, comprising:

setting a maximum speed for the propulsion motor using the speed lever;

causing the propulsion motor to operate from a minimum speed to an intermediate speed to the maximum speed via movement of the clutch lever between a minimum position an intermediate position and a maximum position, where the intermediate speed is between the minimum speed and maximum speed.

* * * * *